United States Patent [19]

Baumeister

[11] Patent Number: 4,684,996

[45] Date of Patent: Aug. 4, 1987

[54] VIDEO PROJECTOR WITH OPTICAL FEEDBACK

[75] Inventor: Hans-Peter Baumeister, Churchville, N.Y.

[73] Assignee: Eastman Kodak Company, Rochester, N.Y.

[21] Appl. No.: 900,211

[22] Filed: Aug. 25, 1986

[51] Int. Cl.$^4$ .......................... H04N 5/74; H04N 3/10
[52] U.S. Cl. ...................................... 358/231; 358/67; 358/69
[58] Field of Search ............... 358/231, 237, 239, 180, 358/60, 63, 67, 69, 70; 315/370, 371

[56] References Cited

U.S. PATENT DOCUMENTS

| | | | |
|---|---|---|---|
| 4,085,425 | 4/1978 | Hamill | 358/231 |
| 4,617,495 | 10/1986 | Culter | 358/69 |
| 4,625,153 | 11/1986 | Micic | 358/69 |

Primary Examiner—Tommy P. Chin
Attorney, Agent, or Firm—Robert M. Wallace

[57] ABSTRACT

Geometric distortion in a scanning beam video laser porjector, or the like, is corrected by comparing the time of arrival of the projection beam at a selected pixel on the projection screen with a predetermined time of arrival, and computing therefrom the changes in beam control required to remove the distortion. A peripheral portion of the projected video field is blank, being reserved for projection of bright beam alignment fiducials comprising selected pixels of the peripheral field portion. An optical fiber is placed on the screen periphery so as to receive one pixel of each projected fiducial, its output being applied (through a light sensitive diode) to a beam control processor or the like. Geometric distortion or a change in projector alignment shifts the beam time of arrival at the sensor. The processor compares the time of arrival of the projector beam at each sensor with a lock-up table and, from this comparison, determines the beam control corrections required to remove geometric distortion. Significantly, only one sensor is required in a given portion of the projected image to precisely measure any alignment shift of a projected beam fiducial, because such a shift changes the beam time of arrival at the sensor by an amount proportional to the magnitude of the alignment shift and by a direction in time (backward or forward in time) corresponding to the direction of the alignment shift.

19 Claims, 18 Drawing Figures

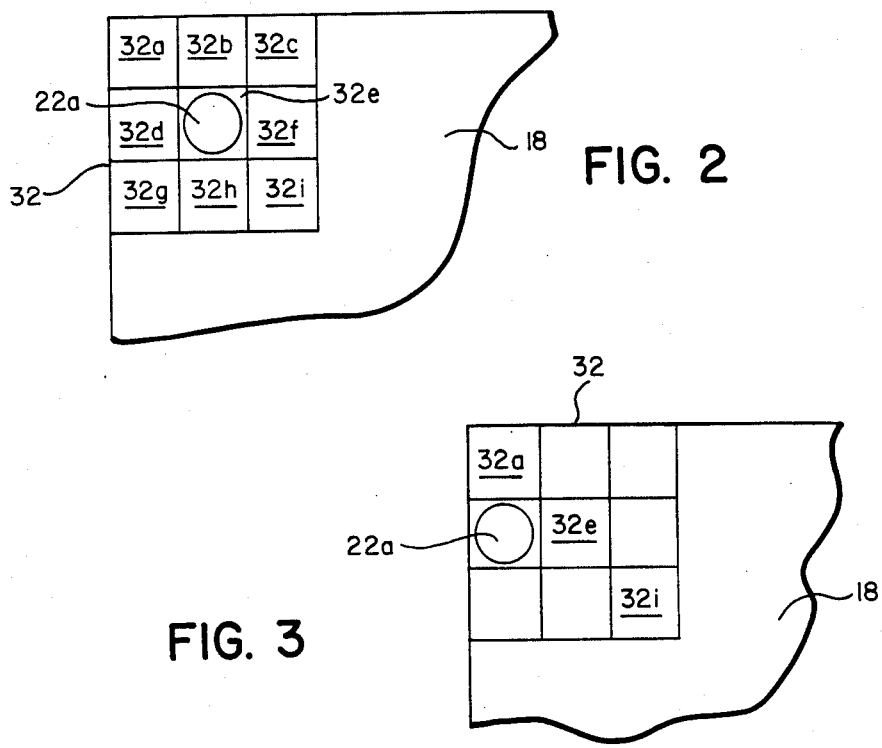
FIG. 2
FIG. 3
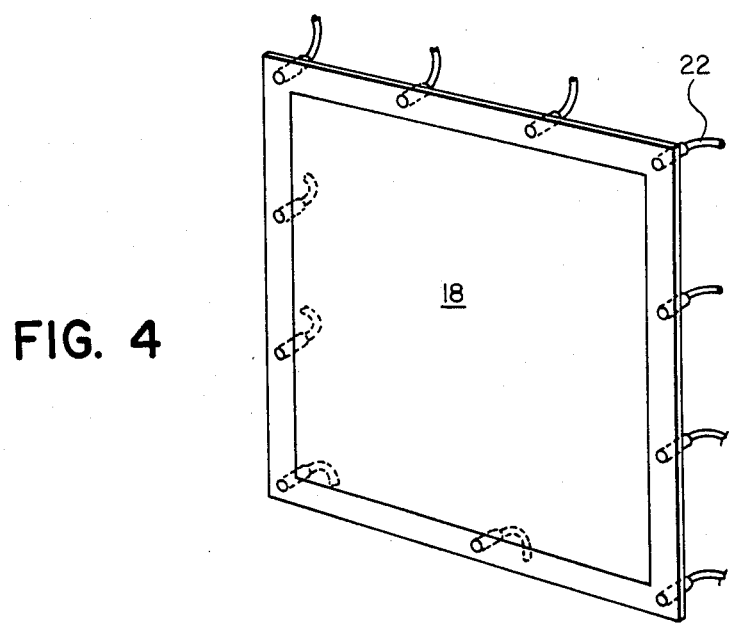
FIG. 4

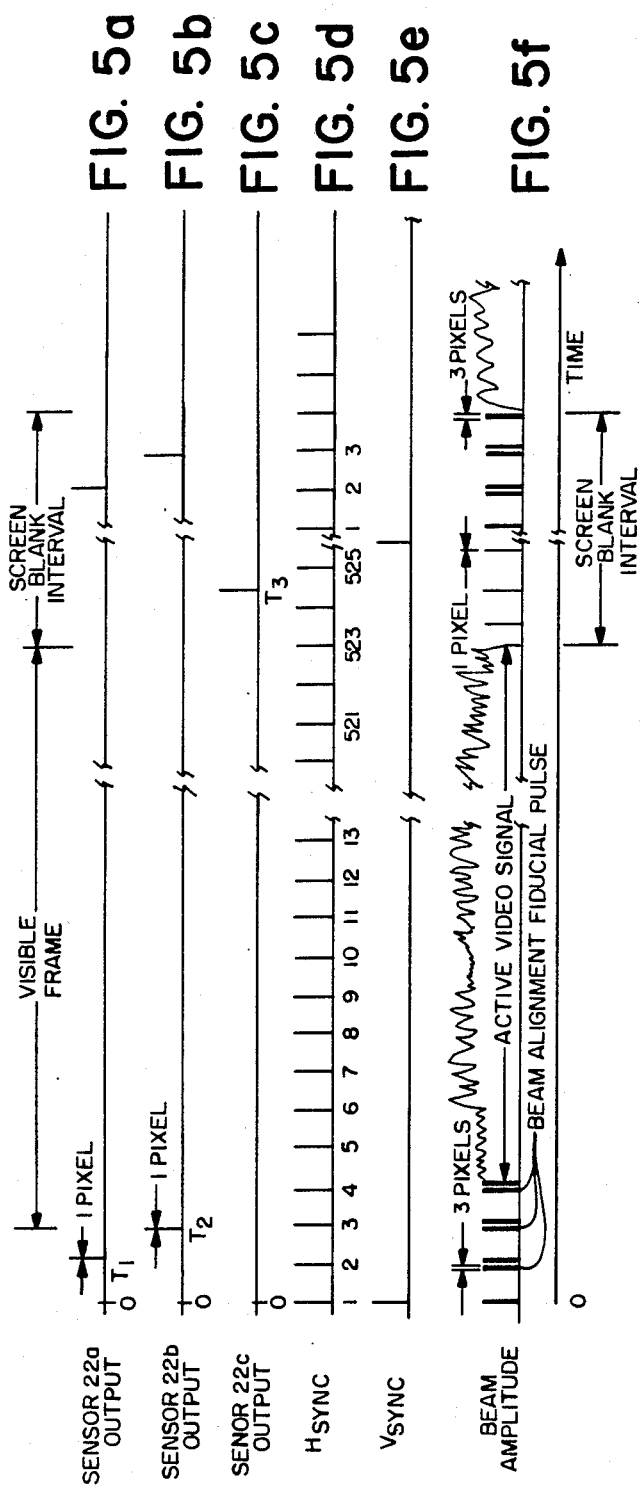

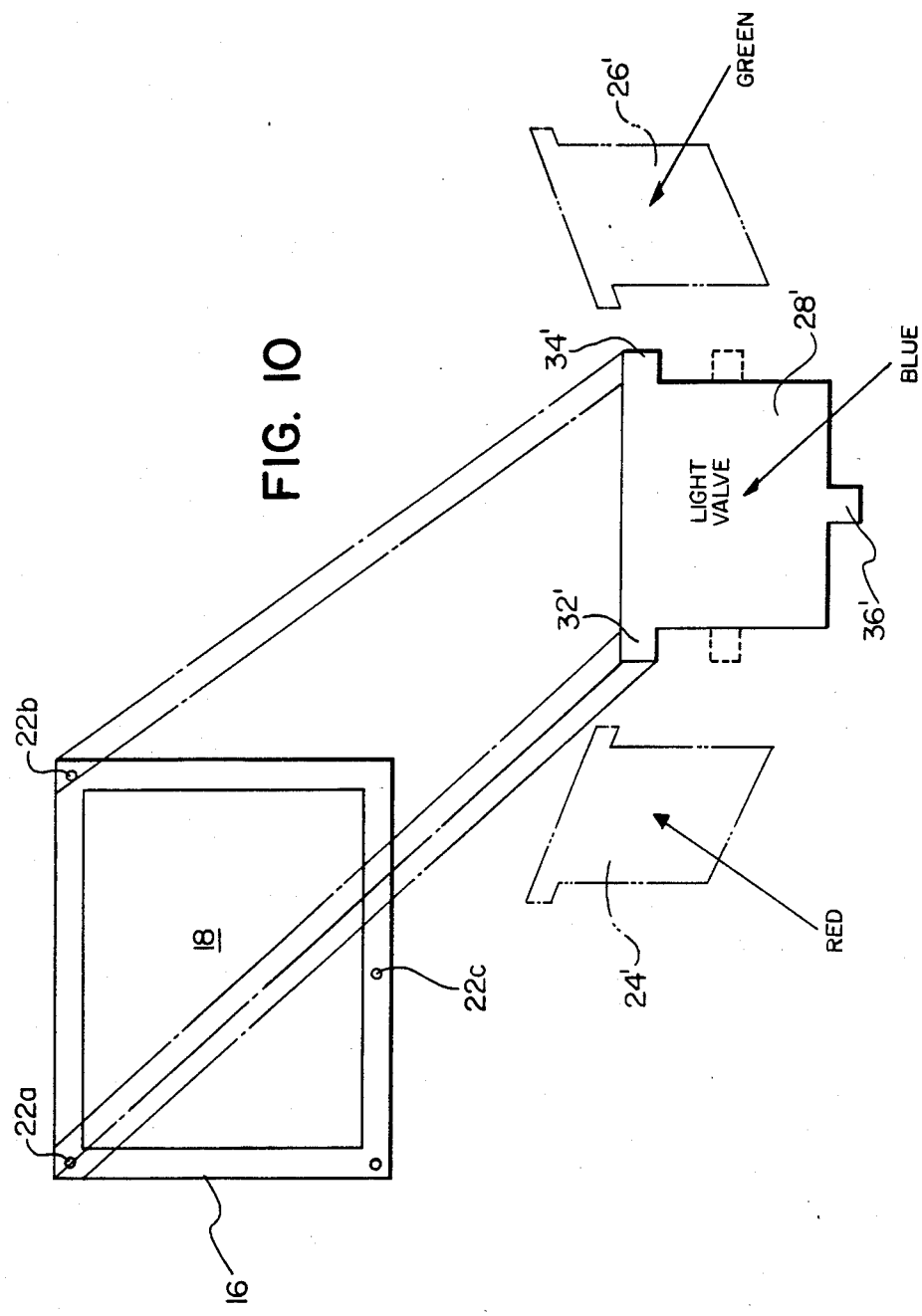

VIDEO PROJECTOR WITH OPTICAL FEEDBACK

BACKGROUND OF THE INVENTION

1. Technical Field

The invention is related to scanning beam video projection systems requiring automatic correction of the geometric distortions in the image projected on a screen. More specifically, the invention is related to video laser projection systems.

2. Description of the Related Art

Numerous techniques are known for correcting geometric distortion in video projection systems. These techniques, however, are limited to removal of a known predetermined distortion, or to removal of distortions sensed internally within a projection video cathode ray tube, for example. These techniques are not adapted to measuring or sensing geometric distortions at a projection screen.

One technique for measuring and sensing geometric distortions at the projection screen of a video projection system, and for correcting such distortions, is disclosed in U.S. Pat. No. 4,085,425. This patent discloses a screen projection alignment system in which the periphery of the screen is blank, except for alignment fiducial areas illuminated by the video projector, the fiducial areas being relatively large (on the order of many video picture elements or pixels) so that the beam alignment control accuracy is limited. At least two relatively large photo sensors which are differentially coupled to an analog output circuit are mounted in the fiducial areas. A change in beam alignment causes one of the sensors to receive less photons than the other sensor, so that the differentially coupled analog circuit senses a voltage between the two sensors and generates an output signal from which may be derived a beam alignment correction to be performed by the video projector. This technique is, therefore, not readily adapted to a scanning beam type of projector, since the two sensors in each alignment fiducial area must be constantly illuminated, rather than being scanned by a small beam. In fact, the referenced patent teaches a light valve type of TV projector, which illuminates all the screen simultaneously, as opposed to a raster type of projector.

3. Problem

In a beam scanning type of video projector, prior known techniques for removing geometric distortion are not suitable, since such techniques either assume a predetemined distortion to be corrected, or required continuous illumination of large alignment fiducial area sensors. Thus, there is a need for an efficient geometric distortion correction system suitable for beam scanning type video projectors—such as video laser projectors—which can take advantage of the small beam diameter for more accurate beam alignment control.

SUMMARY OF THE INVENTION

Solution to the Problem

Geometric distortion in a scanning beam video projector, such as a video laser projector, is sensed by comparing the time of arrival of the beam, at selected beam diameter-size pixels on a projection screen, with a predetermined time of arrival. Apparatus embodying the invention includes means for computing from the foregoing comparison the beam control changes required to remove the geometric distortion and for effecting those changes. The periphery of the projected video field (and of the projector screen) is blank except for small beam alignment fiducials (on the order of three or so beam diameters) illuminated by the projector beam. The length and width of each fiducial projected on the screen periphery corresponds to three (or so) image pixels. An electro-optical sensor, such as a light sensitive diode (or an optical fiber whose output is connected to a light sensitive diode), is placed in the center pixel of each fiducial. The output of each sensor is connected to a beam-control processor. The processor compares the time of arrival of the projector beam at each sensor with a look-up table. From this comparison, the processor senses whether the beam fiducial has wandered with respect to the sensor (indicating a shift in beam alignment) and determines the beam-control correction required to remove any timing differences. Such beam control correction may include adjustment in the magnitude of the vertical or horizontal gain, a re-alignment of the red, green, or blue beams, image rotation, or removal of horizontal or vertical gain non-linearities.

Advantages

A principal advantage of the invention is that the area of each of the sensors is on the order of one video pixel. Because the projected beam is on the order of one video pixel, measurement of the beam time of arrival at each sensor provides a measurement of geometric distortion to an accuracy of one video pixel, which on a large screen may be just several square millimeters. Thus, the invention takes advantage of the rapid beam deflection and small beam size of a video laser projector.

Another advantage of the invention is that in a given area only one sensor is required to sense wandering of a given beam fiducial, greatly reducing the system complexity. This is because a shift in beam alignment produces a corresponding shift in time of arrival of the beam at the sensor. The direction of beam alignment shift is reflected in the direction of change in beam time of arrival at the sensor (i.e., either forward or backward in time).

Electro-Optical Sensors

Timing problems may be elimianted in the invention by use of optical fibers routing the light at each screen location to the photosensitive transducers (i.e., photodiodes). In this embodiment, each fiber end protrudes from a selected pixel location on the screen periphery, and all fibers are of equal length. They are fed in a bundle to an electro-optic transducer chip, which may include photosensitive diodes, generating electrical signals applied to the processor.

DESCRIPTION OF THE DRAWINGS

The invention may be understood by reference to the accompanying drawings in which:

FIG. 2 is a diagram of an illuminated beam alignment fiducial area on the projection screen of FIG. 1;

FIG. 3 illustrates a shift in position of the fiducial area of FIG. 2 corresponding to a change in beam alignment;

FIG. 4 is a perspective view of the projection screen of FIG. 1;

FIGS. 5a through 5f include contemporaneous timing diagrams illustrating the operation of the apparatus of FIG. 1;

FIG. 6 is an expanded timing diagram corresponding to FIG. 5f;

FIG. 10 is a simplified plan view of an apparatus including a light valve embodying the invention.

DETAILED DESCRIPTION

The present invention is applicable in various types of video projection systems, including laser beam projectors characterized by a frame-by-frame progressive scan technique. It is also applicable to interlaced (field-by-field) scanning techniques and to non-scanning techniques employed by light valve video projection systems, for example. The present detailed description concerns the invention as it is applied to a progressive scan video laser projection system.

Figure 1:
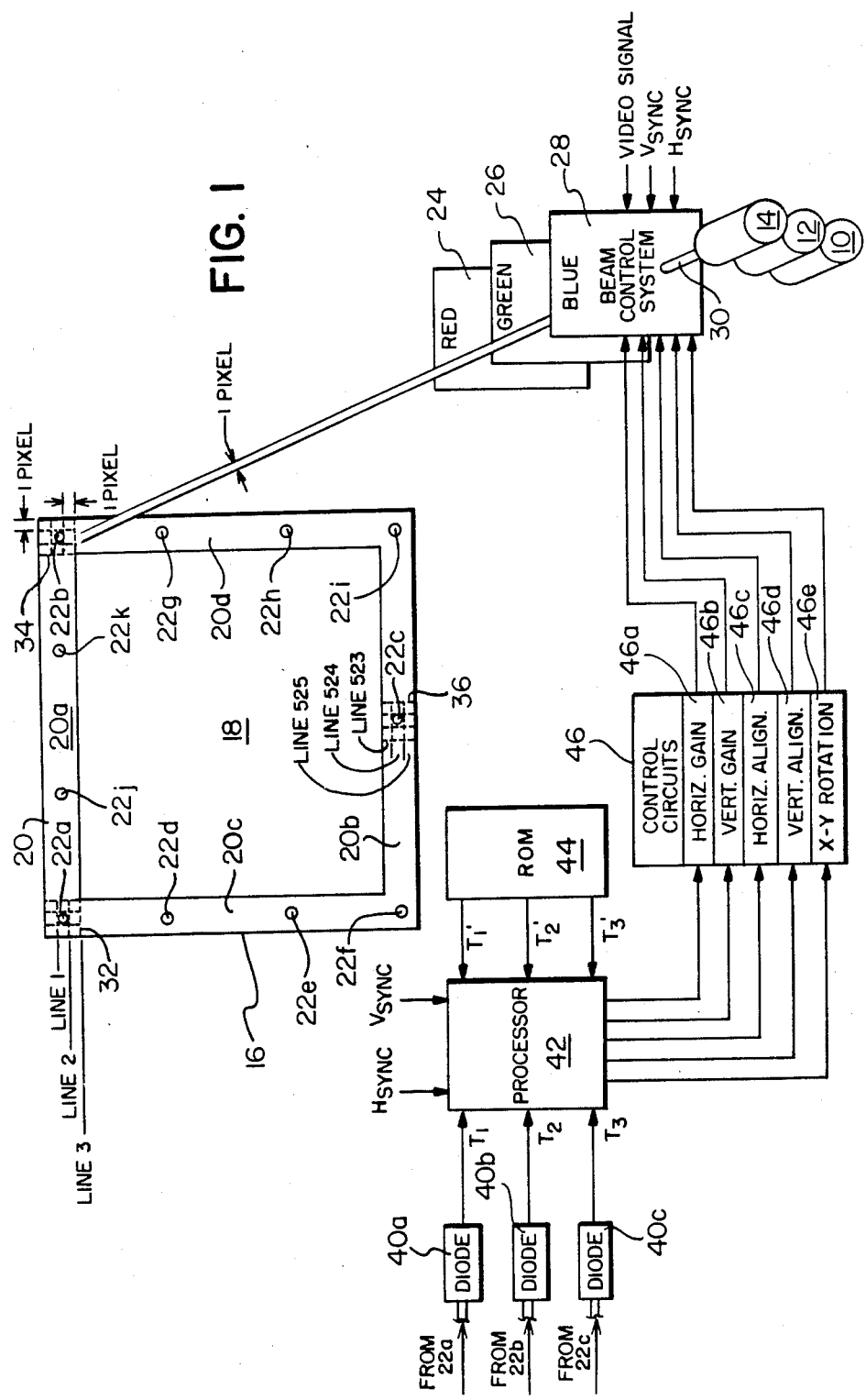
FIG. 1 is a diagram of the apparatus embodying the invention.

Referring to FIG. 1, a video laser projection system embodying the invention includes red, green and blue laser beam generators 10, 12, 14 and a projection screen 16. The projection screen 16 is divided into an active portion 18, in which the video images are projected, and a peripheral portion 20 surrounding the active portion 18. No video images are projected in the peripheral screen portion 20. Typically, the height of the top and bottom peripheral portions 20a, 20b are on the order of 3 horizontal video lines while the width of the vertical peripheral portions 20c, 20d is on the order of the width of 3 video pixels. Preferably, the screen 16 is scanned by 525 horizontal video liens, the first three video lines corresponding to the blank peripheral portion 20a and the last 3 video lines corresponding to the blank peripheral portion 20b. Accordingly, the video frame peripheral edge coincident with the screen periphery 20 (for example, horizontal video lines 1, 2, 3, 523, 524, 525) is, in effect, masked.

Photosensors 22a, b and c are mounted in selected locations on the screen periphery 20, as illustrated in FIG. 1.

The system of FIG. 1 is a rear projection system wherein the image projected on one side of the transmissive screen 16 is viewed from the opposite side. It is well known to use a lenticular material in the screen 16 for such rear projection systems and to blacken (or otherwise render opaque) the boundaries between adjacent ones of the minute lenses comprising the lenticular screen surface, so as to enhance the projected image contrast. Each photosensor 22 may be placed in one of the blackened boundaries so that it does not interfere with the projected image. Furthermore, the screen periphery 20 is also blackened. (If, on the other hand, the system is a front projection system, the screen is reflective and the periphery 20 may be covered with a non-reflective coating.)

A color video image is formed by the red, green and blue laser beam generators 10, 12, 14 under control of red, green and blue beam control systems 24, 26, 28, respectively. Each of the beam control systems 24, 26, 28 receives the respective color component of the video signal, along with the video signal vertical sync and horizontal sync pulses. The beam control system 24, 26, 28 electro-optically modulate each laser beam with the video signal in accordance with well-known techniques and cause the laser beam to scan the screen in synchronism with the horizontal and vertical scan rate of the video signal. In the following description, while it is understood that the three laser generators 10, 12, 14 and the beam control systems 24, 26, 28 are cooperative, only the operation of the blue laser beam generator 14 and the blue beam control system 28 will be described in detail herein, for the sake of simplicity. The blue beam generator 14 generates a blue beam 30 characterized by a beam diameter corresponding to one horizontal video line or, equivalently, to one video pixel. As the beam scans the first horizontal line, line 1, the beam is blanked, except during the time it passes through beam alignment fiducial areas 32, 34 surrounding the photosensors 22a, 22b respectively.

Referring to FIG. 2, the pattern of the alignment fiducial area 32 is shown in greater detail and is divided into 9 image pixels in a square of 3×3 pixels, 32a–32i. The photosensor 22a lies in the middle pixel 32e of the alignment fiducial area 32 (in the absence of beam misalignment or distortion). During the first three "pixel times" of horizontal lines 1–3, the beam 30 is "on" in order to illuminate each of the pixels 32a–i. The alignment fiducial area 34 is similarly arranged in 9 pixels in a 3×3 pixel square surrounding the photosensor 22b. Preferably, the sensors 22a and 22b are separated by one pixel from the upper right and left corners, respectively, of the periphery 20, as shown in FIG. 1.

The photosensor 22c is in the middle of an alignment fiducial area 36 which has a width of three image pixels and a height of three pixels. The beam 30 is "on" for three "pixel times" during the middle of video lines 563, 564 and 565 in order to iluminate the fiducial area 36.

The three alignment control systems 24, 26, 28 are individually aligned with respect to the sensors 22a, b, c at different times. Thus, for example, during a first video frame, the red beam generator 10 and alignment system 24 project red fiducials 32, 34, 36, and alignment corrections are made by the red alignment system 24 based upon feedback from the sensors 22a, b, c. Then, during the next (second) video frame, the green beam generator 12 and alignment system 26 projects green fiducials 32, 34, 36 in order to correct the green beam alignment. Finally, during the following (third) video frame, the blue beam generator 14 and alignment system 28 project blue fiducials 32, 34, 36, so that the blue beam system 28 may correct the blue beam alignment based upon feedback from the sensors 22a, b, c. Preferably, a temporary departure from this red-green-blue alignment sequence is made whenever one of the three beams is so badly misaligned as to require continuous alignment correction, during which little or no alignment correction is performed for the other two beams. (In an interlaced--field-by-field--scanning system, it would require, of course, two fields to project each set of fiducials 32, 34, 36, so that the system would "wait" while the sensors 22 receive two video fields, before making any alignment corrections.) The manner in which feedback from the sensors 22a, b, c is used by the progressive scan red, green and blue laser beam alignment control systems 24, 26 28 to correct beam alignment is the same for each system 24, 26, 28, and is described in the next subtitled section of this specification for the blue beam alignment control system 28.

Of course, alignment correction by the three alignment control systems 24, 26, 28 may be performed simultaneously if three sets of monochromatic or colorselective sensors 22 are used (i.e., narrow-band red, green and blue sensors), each of the red, green and blue sets of sensors being coupled to a respective one of the red, green and blue control systems 24, 26, 28. Preferably, in this case, the red, green and blue individual versions of each of the projected fiducials 32, 34, 36 would be at least slightly offset from one another so that a red, a green and a blue sensor would not have to be located in exactly the same "pixel" on the screen 16.

Time of Arrival Beam Misalignment Sensing

If the image produced by the beam 30 is shifted or misaligned with respect to the screen 16, the time of arrival of the beam of at least one of the photosensors 22a, 22b and 22c will be shifted in a corresponding manner. For example, if the image is shifted to the right by one video pixel with respect to the screen 16, the resulting position of the illuminated fiducial area 32 with respect to the photosensor 22a will correspond to the pattern illustrated in FIG. 3. The video pixel 32d, rather than the middle video pixel 32e, is coincident with the photosensor 22a. Accordingly, the time of arrival of the beam at the sensor 22a is advanced by the time required for the beam 30 to scan one pixel width. This shift in time provides an exact measure of the spatial misalignment of the beam in the fiducial pattern of FIG. 3 and may be used to re-align the beam to the centered (correct) fiducial pattern of FIG. 2.

Means for accomplishing this result are illustrated in FIG. 1 and include three electro-optical transducers (i.e., light sensitive diodes) 40a, 40b, 40c having their inputs connected to respective ones of the photosensors 22a, b, c and their outputs connected to a processor 42. A read-only memory 44 is also connected to the processor 42. The read-only memory 44 contains a look-up table giving the correct times of arrival of the beam for each of the sensors 22a, b, c. The processor 42, using the video signal vertical sync pulse $V_{sync}$ as a reference, measures the time of arrival of the beam at each of the sensors 22a, b, c, by sensing their outputs through the transducers 40a, b, c, respectively and compares these times of arrival with the correct times of arrival stored in the read-only memory 44. (It is understood, of course, the correct times of arrival correspond to the "correct" beam fiducial pattern of FIG. 2.)

If the processor 42 senses a difference between the actual beam time of arrival at any of the sensors 22a, b, c, and the corresponding correct beam time of arrival, the processor 42 determines the beam alignment correction required to re-establish the correct beam fiducial pattern of FIG. 2. For this purpose, the processor 42 generates output signals applied to beam control circuits 46 controlling the blue beam control system 28. The control circuits 46 include various types of well-known video circuits including a horizontal gain control circuit 46a, a vertical gain control circuit 46b, a horizontal alignment control circuit 46c, a vertical alignment control circuit 46d, and an X-Y rotation circuit 46e. The processor 42 issues separate control signals ("commands") to each of the control circuits 46a–e.

Programmed Production Tolerance Control

Errors in the location of each of the photosensors 22a, b, c during manufacturing of the screen 16 may be sensed during production testing, and the times of arrival listed in the look-up table stored in the ROM 44 may be altered accordingly to accomodate the errors. As a result, the ROM 44 may be programmed so that inaccurate placement of the sensors 22a, b, c on the screen 16 has no effect whatsoever on the accuracy of the beam alignment system of FIG. 1.

This may be accomplished during production testing by storing in the read-only memory 44 the times of arrival at the various sensors 22 of a projection beam which is known to be perfectly aligned with the screen 16.

Photosensor Output Timing

Referring to the contemporaneous timing diagrams of FIG. 5, the photosensors 22a and 22b produce output pulses at the beginning and end, respectively, of the second horizontal line (line 2) of each video frame, while the photosensor 22c produces an output pulse in the middle of the second to last horizontal line (line 564) of each video frame, if the beam is correctly aligned. In order to illuminate the 3×3 pixel alignment fiducial areas 32, 34 and 36, the beam amplitude is modulated as shown in FIG. 5f. The beam is turned on while scanning the first and last three pixels of the first three horizontal lines of each video frame and while scanning the middle 3 pixels of the last three horizontal lines of each video frame.

Adaptive Variation of the Fiducial Areas

The 3×3 pixel size of the fiducial areas 32, 34 illuminated by the beam is adequate so long as the beam misalignment never exceeds one pixel width. In order to accomodate larger beam misalignments which tend to occur during initial system power up, the fiducial areas 32, 34 illuminated by the beam 30 may be temporarily increased, beyond the 3×3 pixel size shown in FIG. 1, whenever the system is first turned on or whenever it encounters large mechanical disturbances, so that gross beam misalignments do not cause the beam fiducials to completely miss the photosensors 22a, b. Of course, once the sensors 22 and feedback system "capture" a portion of each fiducial 32, 34, 36, the fiducial size may be rapidly decreased as alignment correction proceeds, until the fiducials are reduced to their minimum area (3×3 pixels).

Timing

The timing diagram of FIG. 5f is shown in expanded scale in FIG. 6. Screen blank intervals mask peripheral portions of the active video signal corresponding to the blank screen periphery 20. All of the beam alignment fiducial pulses of FIG. 5f occur during the screen blank intervals. The screen blank intervals occur between successive video lines and between successive video frames and are of longer duration than the standard horizontal and vertical blanking intervals, such as is specified for NTSC video signal.

Processor Operation

Referring to FIG. 1, the processor 42 compares the actual beam times of arrival $T_1$, $T_2$, $T_3$ at the sensors 22a, 22b, 22c, respectively, with the correct times of arrival $T_1'$, $T_2'$, $T_3'$ respectively, stored in the read-only memory 44. The actual beam arrival times $T_1$, $T_2$, $T_3$ at the sensors 22a, b, c correspond to the sensor output pulses occuring at times $T_1$, $T_2$, $T_3$ of FIGS. 5a, b, c, respectively.

If the beam alignment fiducials 32, 34, 36 are precisely aligned with respect to the sensors 22a, b, c in the manner illustrated in FIG. 1, the actual times of arrival $T_1$, $T_2$, $T_3$ equal the correct times of arrival $T_1'$, $T_2'$, $T_3'$.

Any differences between the actual and corresponding correct times of arrival provide a measure of a geometric distortion, which the processor 42 senses to generate corrective signals applied to the control circuits 46.

Operation of the processor 42 is summarized in Table 1. Table 1 contains a simplified listing of the programmed instructions stored in the ROM 44 and executed by the processor 42 in repetitive cycles. As in the foregoing description, only the operation of the blue beam control system 28 will be described, for the sake of simplicity. In the following algorithm, the processor 42 distinguishes between horizontal and vertical beam misalignments according to whether the discrepancy between the actual and the "correct" beam arrival time is less than or greater than one video horizontal scan period $1/F_H$.

TABLE 1

Processor Instructions

1. Definitions: $(T_1) = T_1' - T_1$; $(T_2) = T_2' - T_2$; $F_H$ = horizontal video line scan frequency; $(T_3) = T_3' - T_3$.
2. If either $(T_1)$ or $(T_2)$ is less than $1/F_H$ go to horizontal alignment sub-routine.
3. If either $(T_1)$ or $(T_2)$ is greater than $1/F_H$ go to vertical alignment sub-routine.
4. Perform horizontal gain sub-routine.
5. Perform vertical gain sub-routine.
6. Perform rotation sub-routine.

Horizontal Alignment Sub-Routine

7. If $(T_1)$ is not equal to $(T_2)$ go to horizontal gain sub-routine.
8. If $(T_1)$ is less than 0, command the horizontal alignment circuit 46c to shift the projector beam horizontal alignment one pixel to right.
9. If $(T_1)$ greater than 0, command the horizontal circuit 46c to shift the projector beam horizontal alignment one pixel to left.
10. Go to 3.

Vertical Alignment Sub-Routine

11. If $(T_1)$ is not equal $(T_2)$ go to rotation sub-routine.
12. If $(T_1)$ is less than 0, command the vertical alignment circuit 46d to shift the projector beam vertical alignment one pixel up.
13. If $(T_1)$ is greater than 0, command the vertical alignment circuit 46d to shift the projector beam vertical alignment one pixel down.
14. Go to 4.

Rotation Sub-Routine

15. If $(T_1)$ is greater than $(T_2)$, command the X-Y rotation circuit 46e to rotate the X-Y beam deflection axis clockwise by one pixel as measured at the video field edge.
16. If $(T_1)$ is less than $(T_2)$, command the X-Y rotation circuit 46e to rotate beam deflection axis counterclockwise by one pixel as measured at the video field edge.
17. Go to 1.

Horizontal Gain Sub-Routine

18. If $(T_2)$ is less than $(T_1)$, command the horizontal gain circuit 46a to decrease horizontal gain so as to reduce projected image width by one pixel width.
19. If $(T_2)$ is greater than $(T_1)$, command the horizontal gain circuit 46a to increase horizontal gain so as to increase projected image width by one video pixel width.
20. Go to 5.

Vertical Gain Sub-Routine

21. If $(T_3)$ is greater than $1/F_H$, command the vertical gain circuit 46b to reduce vertical gain so as to reduce the projected image height by one horizontal line.
22. If $(T_3)$ is less than $1/F_H$, command the vertical gain circuit 46b to increase vertical gain so as to increase projected image height by one horizontal line.

In the algorithm of Table I, the instructions executed by the processor 42 use the error data generated by the sensors 22a, 22b to correct for misalignment of the active image field 18 with respect to the screen 16, including rotation, horizontal and vertical misalignment and horizontal gain error. Once these errors are corrected, the processor uses the error data generated by the photosensor 36 to adjust the vertical gain.

Correction of Non-Linearities

Figure 7:
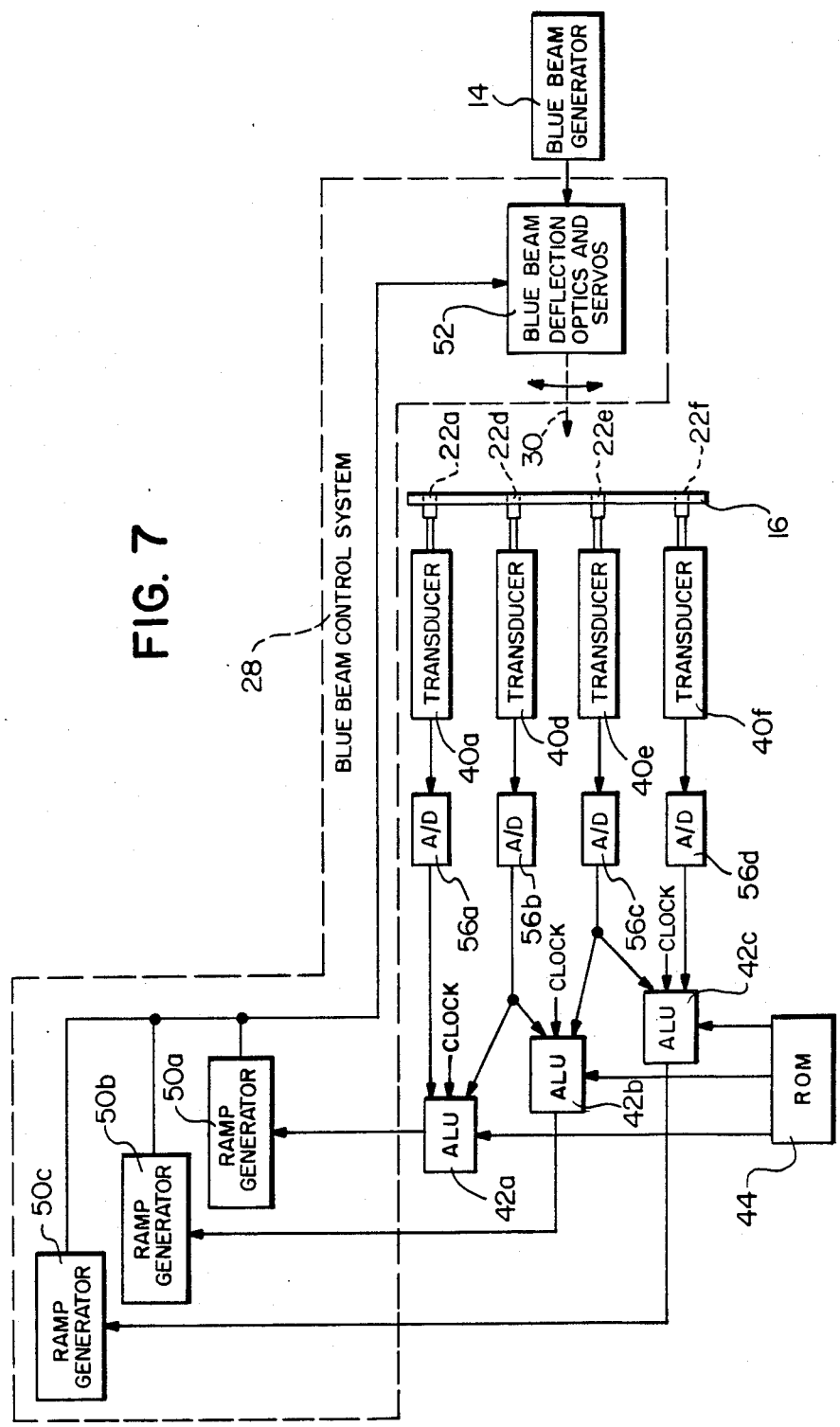
FIG. 7 is a block diagram of a gain control apparatus useful in conjunction with the apparatus of FIG. 1.
Figure 8A:
FIGS. 8a through 8d contemporaneous timing diagrams illustrating the operation of the apparatus of FIG. 7.
Figure 8B:
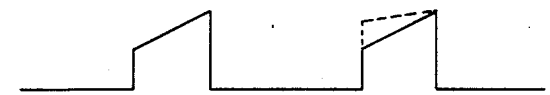
Figure 8C:
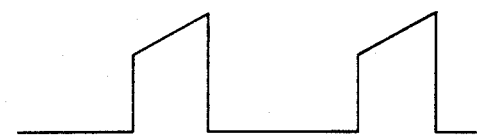
Figure 8D:
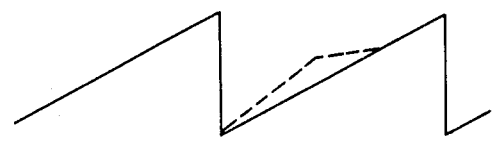

Various well-known non-linear geometric distortions (such as the so-called "pin cushion" effect) may be corrected in accordance with the invention. As illustrated in FIG. 7, the beam control system 28 includes a ramp generator 50 connected to beam deflection optics and servos 52. The ramp generator 50 generates ramp signals such as that illustrated in FIG. 8d which cause the beam deflection optics 52 to move the beam 30 across the screen 16 in synchronism with the video $H_{sync}$ and $V_{sync}$ pulses accompanying the incoming video signal. In order to provide correction for non-linear geometric distortion, the ramp generator 50 is divided into a plurality of ramp generators 50a, b, c, etc., which generate different portions of the signal of FIG. 8d, illustrated in FIGS. 8a, b, c, respectively. In the simplified example of FIG. 8, the ramp generator 50 is divided into only three ramp generators, although it is contemplated that the ramp generator 50 may comprise many such ramp generators, each generating a small portion of the ramp signal FIG. 8d.

The processor 42 includes arithmetic logic units 42a, 42b, 42c controlling individual ones of the ramp generators 50a, 50b, 50c, respectively. Referring to FIG. 1, the screen 16 may include additional photosensors 22d-k along its outer periphery 20. Although in the example of FIG. 1 only three or four sensors 22 are mounted along an edge of the screen 16, many more such sensors may be placed along the screen periphery in accordance with the invention.

FIG. 7 illustrates the connection of only the sensors 22a, d, e, f along the left periphery 20c of the screen 16 to the arithmetic logic units 42a, b, c. If it understood that other arithmetic logic units are connected to the remaining photosensors 22 on the screen 16. The arithmetic units 42a, b, c are connected to adjacent pairs of the photosensors 22a, d, e, f through analog-to-digital converters 56a, b, c, d, respectively. The output of the read-only memory 44 and a clock signal CLK are applied to each of the arithmetic logic units 42a, b, c. The read-only memory 44 furnishes each individual arithmetic logic unit 42a, b, c with the correct difference between times of arrival of the projector beam at adjacent sensors 22. Each arithmetic logic unit 42a, b, c computes the actual difference between beam times of arrival at adjacent sensors 22, using the CLK signal as a reference. The actual time difference for each sensor pair is compared against the correct time difference stored in the ROM 44. If any discrepancies between actual and "correct" beam arrival time differences are sensed, an error signal is transmitted to the corresponding one of the ramp generators 50a, b, c so as to change the slope of the individual portion of the ramp curve of FIG. 8a, b, or c, respectively, thereby reducing such discrepancies.

One example is illustrated in the dashed lines of FIG. 8d. In this example, a non-linear distortion causes the beam arrival time difference sensed between the sensors 22a, d and the time difference sensed between the sensors 22d, e to be greater than the corresponding time differences stored in the read-only memory 44. The error correction signals applied by the arithmetic logic units 42a, b to the ramp generators 50a, b change the slope of the ramp signals of FIGS. 8a and b to the contours indicated in dashed line.

Exemplary Logic Design

Figure 9:
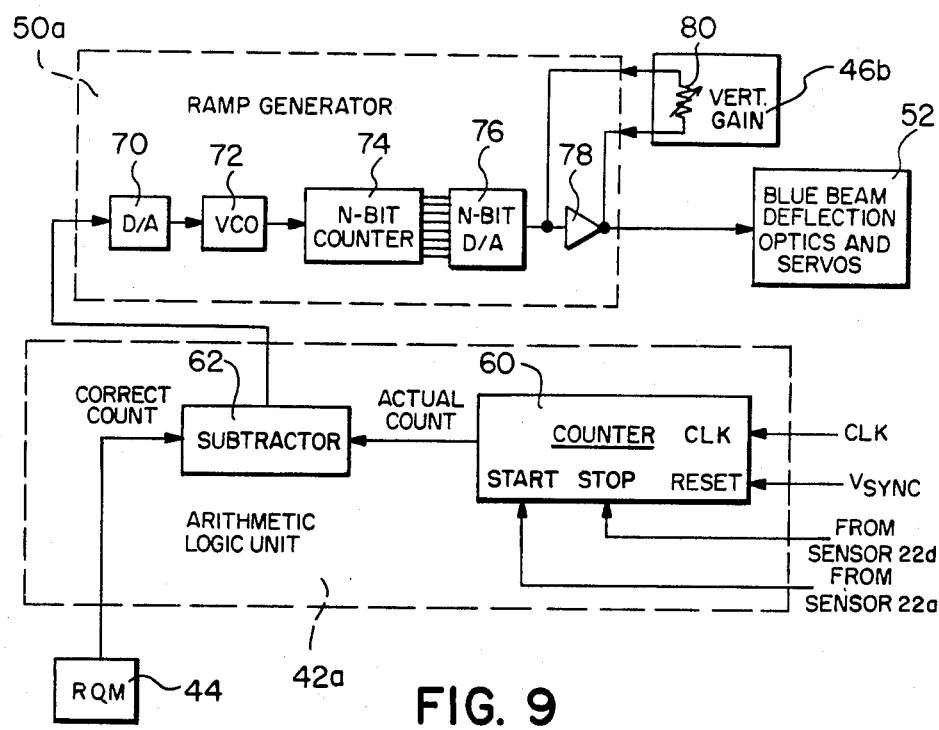
FIG. 9 is a simplified block diagram illustrating one of the arithmetic logic units in a ramp generator of the apparatus of FIG. 7.

One possible implementation of the arithmetic logic unit 42a and the ramp generator 50a is illustrated in FIG. 9. The arithmetic logic unit 42a includes a counter 60 and a subtractor 62, which are both 8 bit logic devices. The counter 60 has a start input, a stop input, a reset input and a clock input. The clock input receives the clock signal CLK and the reset input receives the $V_{sync}$ signal. The start input of the counter 60 is connected to the sensor 22a while the stop input is connected to the sensor 22d. The output of the counter 60 is applied to one input to the subtractor 62. The other input to the subtractor 62 receives an 8-bit word from the read-only memory 44 corresponding to the correct count for the time difference between sensors 22a and 22d. The counter 60 begins counting as soon as the beam scans across the sensor 22a and stops counting after the beam 30 scans across the sensor 22d. This count is subtracted by the subtractor 62 from the correct count furnished by the ROM 44 and the difference is transmitted to the ramp generator 50a.

The ramp generator 50a includes a digital-to-analog converter 70, a voltage controlled oscillator 72, an N-bit counter 74 and an N-bit digital-to-analog convertor 76. The output of the digital-to-analog convertor 76 is connected to an amplifier 78, whose output is applied to the blue beam deflection optics and servo 52. The gain of the amplifier 78 is controlled by the vertical gain control circuit 46b through a variable feedback resistance 80. The counter 74 counts output pulses from the VCO 72 to generate an increasing count which is applied to the digital-to-analog converter 76, whose analog output is amplified by the vertical gain amplifier 78, and applied to the blue beam deflection optics 52. The counter 74 resets each time its count reaches $2^N$. Preferably, the initial frequency of the VCO 72 and the number of bits, N, are selected so that the period of the counter 74 equals the period T of the sawtooth output that ramp generator 50a illustrated in FIG. 8a. The error signal generated by the subtractor 62 is converted by the digital-to-analog converter 70 and applied to the VCO 72 to change the frequency of the VCO 72. This in turn changes the slope of the ramped wave form of FIG. 8a generated by the ramp generator 50a. (This may cause an error in the vertical gain, so that the vertical gain control circuit 46b changes the variable resistance 80.)

Preferred Embodiment of the Screen 16

Referring to FIG. 4, each of the sensors 22 mounted on the periphery 20 of the screen 16 comprise individual optical fibers 22 of equal length, each characterized by a diameter at the surface of the screen periphery 20 corresponding to the height of one horizontal line of the active video field 18 projected on the screen 16 (or, equivalently, to one video pixel diameter). Each optical fiber 22 is coupled through transducers 40a, b, c to the processor 42. Preferably, the transducers 40a, b, c are all mounted on a single chip (not shown), and the optical fibers 22 are fed as a bundle to the chip. The transducers 40 may be an array of photosensitive diodes mounted on the chip, or individual diodes receiving the optical output of individual optical fibers 22.

Light Valve Video Projector

A light valve video projector, such as a liquid crystal light valve projector, or the like, may be implemented in accordance with the present invention, as illustrated in FIG. 10. The screen 16 of FIG. 10 corresponds to the screen 16 in FIG. 1, and includes the 3 photosensors 22a, b, c. The blue beam control system 20a may be a liquid crystal light valve matrix 28', of the type well-known in the art. However, in accordance with the invention, the light valve matrix 28' includes "extensions" 32', 34' and 36', which are in optical alignment with the aligment fiducial areas 32, 34 and 36, respectively, projected on the blank screen periphery 20. The output of the sensors 22a, b, c provide optical feedback for aligning the liquid crystal light valve matrix 28' with respect to the screen 16. The system of FIG. 10 further includes red and green liquid crystal light valve arrays 24', 26' identical in shape to the liquid crystal light valve array 28'.

In order to produce the "beam time of arrival" information at each of the sensors 22a, b, c for processing in accordance with the foregoing description of FIGS. 1-6, each individual liquid crystal light valve pixel in the extensions 32', 34' and 36' is activated individually at specific times, reflecting the time of arrival information stored in the read-only memory 44. (This is in contrast to typical practice with liquid crystal light valves, in which every liquid crystal pixel is continuously activated.) In accordance with the invention, the video signal applied to the array 28' would correspond to the signal of FIG. 5, in which the active video signal illuminates the active screen portion 18 while the individual pixels in the extended portions 32', 34', 36 sensors 22a, b, c are activated individually at different times (e.g., $T_1$, $T_2$, $T_3$ of FIGS. 5a, b, c).

In the embodiment of FIG. 10, the right and left extended portions 32', 34' may be located half way down the sides of the array 28' (as indicated in dashed line) and the extended portion 36' may be eliminated (since only two points of alignment are required, the liquid crystal array 28' being generally permanent in shape and size and no horizontal or vertical gain adjustments being possible by changes to the array 28' itself). Because all of the pixels in the light valve array 28' may be active and illuminated simultaneously, projection of the alignment fiducials 32, 34 in the screen 16 by the extended light valve portions 32', 34', and alignment correction therewith, may be performed continuously independently of the projection of a video image in the active screen portion 18. Thus, the speed at which such alignment corrections are performed is limited only by the size of the projected fiducials 32, 34. This speed increases as the fiducial size is adaptively reduced following initial turning-on of the system.

While the invention has been described in detail with particular reference to preferred embodiments thereof, it is understood that variations and modifications thereof may be made within the spirit and scope of the invention.

What is claimed is:

1. A video beam projector system, comprising:
    at least one beam generator adapted to generate an illuminating beam;
    a projection viewing screen;
    beam deflection control means for modulating said beam in synchronism with an incoming video signal, and for deflecting said beam so as to raster-scan said screen with a projected video image field on at least a portion of said screen;
    opto-electronic sensing means for sensing the actual time of arrival of said beam at particular points on said screen;
    means for comparing said actual beam arrival time at each of said screen points with a predetermined beam arrival time;
    means connected to said beam control means for re-aligning said projected video image with respect to said screen in response to said comparing means so as to reduce any differences between said actual and predetermined beam arrival times, wherein said opto-electronic sensing means comprises a single sensor at each given one of said particular screen points, so as to minimize the number of such single sensors.

2. The video projector system of claim 1 wherein said opto-electronic sensing means comprises a plurality of optical receivers characterized by a diameter about equal to that of said beam.

3. The video projector system of claim 2 wherein each one of said optical receivers generates an output pulse upon the arrival of said beam at said one optical receiver, wherein a spatial shift in said projected video image field with respect to said screen causes a corresponding shift in said actual beam arrival time at said one optical receiver.

4. The video projector system of claim 3 wherein:
    said optical receivers are each located in separate segments on said screen;
    said beam deflection control means comprises separate scan generators corresponding to said separate screen segments; and
    said comparing means separately compares said actual beam arrival times corresponding to each of said screen segments with said predetermined arrival times and transmits individual correction signals to corresponding ones of said separate scan generators.

5. The video projector of claim 2 wherein said plurality of optical receivers comprise a plurality of optical fibers of equal length, each having one of its end mounted on said screen in one of said particular screen locations.

6. The video projector of claim 2 wherein said beam control means comprise a light valve matrix having a plurality of cells, each of said cells corresponding to an individual image pixel on said screen, said matrix further comprising cells corresponding to said optical receivers on said screen.

7. The video projector system of claim 6 further comprising means for activating different ones of said cells at different times corresponding to respective ones of said predetermined beam arrival times.

8. The video projection system of claim 3 wherein:
    said plurality of optical receivers comprise at least two of said optical receivers located near the top of said screen in right and left respective corners of said screen; and
    said individual alignment areas comprise two square illuminated areas having a height of at least three horizontal video lines and symmetrically surrounding said two optical receivers.

9. The video projector system of claim 3 wherein said beam control means determines the size of said individual alignment areas and adaptively varies said size whenever necessary so that said alignment areas are in registration with said optical receivers even in the presence of large beam misalignments.

10. The video projector of claim 1 wherein said beam control means further comprises means for storing said predetermined beam arrival times, and wherein said predetermined arrival times stored in said storing means include adjustments made for manufacturing alignment errors.

11. In a video beam projector system comprising at least one beam generator adapted to generate an illuminating beam, a projection viewing screen and control means for modulating said beam in accordance with an incoming video signal and for deflecting said beam so as to scan said screen with a projected video image field on at least a portion of said screen, a geometric distortion control system comprising;
    opto-electronic means for sensing the actual time of arrival of said beam at particular locations on said screen:
    means for comparing said actual beam arrival time at each of said screen locations with a predetermined beam arrival time; and
    means connected to said beam deflection control means for re-aligning said projected video image with respect to said screen in response to said comparing means so as to reduce any differences between said actual and predetermined beam arrival times.

12. The video projector system of claim 11 wherein said opto-electric sensing means comprise a plurality of optical receivers mounted on the periphery of said screen characterized by a size corresponding to the diameter of said beam, and wherein said projected video image field on said screen falls within an area in said screen surrounded by said screen periphery.

13. The video projector system of claim 12 wherein each individual one of said optical receivers generates an output pulse upon the actual arrival of said beam at said individual optical receiver, so that a shift in said projected video image field with respect to said screen causes a corresponding shift in the actual beam arrival time at at least one of said optical receivers.

14. The video projector system of claim 13 wherein:
    said optical receivers are each located in separate segments of said screen periphery;
    said beam deflection control means comprise separate scan generators corresponding to said separate screen segments; and
    said comparing means separately compares said beam arrival times corresponding to each of said segments, and transmits difference signals to corresponding ones of said separate screen generators.

15. The video projector of claim 12 wherein said plurality of optical receivers comprise a plurality of optical fibers of equal length each having one of its ends mounted on said screen in one of said particular screen locations.

16. The video projector of claim 12 wherein said beam control means comprise a light valve matrix having a plurality of cells, each of said cells corresponding to a particular image pixel on said screen, said matrix further comprising alignment cells corresponding to said optical receivers on said screen periphery.

17. The video projector system of claim 16 further comprising means for activating different ones of said alignment cells at different ones of said predetermined times of arrival.

18. A video beam projector system, comprising:
   a projection screen;
   means for scanning an optical beam across said screen;
   means mounted on said screen for providing optical feedback to said beam scanning means coincident with the time of arrival of said beam at specific locations on said screen;
   means for storing predetermined times of arrival corresponding to each of said specific locations;
   feedback control means sensitive to said optical feedback for controlling said scanning means so as to alter the motion of said beam across said screen whereby to minimize the differences between said times of arrival of said beam and corresponding ones of said predetermined times of arrival.

19. The system of claim 18 wherein said optical beam projects a video image on said screen characterized by an image pixel size at least nearly equal to that of said beam, and wherein said optical feedback providing means comprises individual optical sensors characterized by said pixel size.

* * * * *